(12) United States Patent
Kimura (10) Patent No.: US 9,437,057 B2
(45) Date of Patent: *Sep. 6, 2016

(54) CONSTRUCTION MACHINE CONTROLLER (71) Applicant: Komatsu Ltd., Tokyo (JP)

(72) Inventor: Yasunori Kimura, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/352,432

(22) PCT Filed: Aug. 20, 2013

(86) PCT No.: PCT/JP2013/072218
§ 371 (c)(1),
(2) Date: Mar. 4, 2015

(87) PCT Pub. No.: WO2015/025367
PCT Pub. Date: Feb. 26, 2015

(65) Prior Publication Data
US 2015/0170441 A1 Jun. 18, 2015

(51) Int. Cl.
| G07C 5/08 | (2006.01) |
| G05B 19/05 | (2006.01) |
| G05B 15/02 | (2006.01) |
| G06F 9/50 | (2006.01) |
| G06F 11/07 | (2006.01) |

(52) U.S. Cl.
CPC ............ *G07C 5/085* (2013.01); *G05B 15/02* (2013.01); *G05B 19/05* (2013.01); *G06F 9/50* (2013.01); *G06F 11/0739* (2013.01); *G06F 11/0766* (2013.01)

(58) Field of Classification Search
CPC .. G05B 19/05; G05B 15/02; B60R 21/0132; G06F 11/0766; G06F 9/50; G06F 11/0739; G07C 5/085

See application file for complete search history.

(56) References Cited

U.S. PATENT DOCUMENTS

| 7,472,051 B2 | 12/2008 | Mariani et al. |
| 2004/0064519 A1 | 4/2004 | Kato et al. |
| 2005/0071064 A1* | 3/2005 | Nakamura et al. ............ 701/50 |
| 2005/0195575 A1* | 9/2005 | Chu ........................ G06F 1/12 361/728 |

(Continued)

FOREIGN PATENT DOCUMENTS

| JP | 62-187901 A | 8/1987 |
| JP | 06-242979 A | 9/1994 |

(Continued)

OTHER PUBLICATIONS

"Simple and Detailed Explanation on the Latest Information about FPGAs, Guide on White Papers, Design Multiprocessor Systems Freely", Nikkei Technology online, Nikkei Business Publications, Inc., [searched on Oct. 7, 2014], via the Internet URL:<http://special.nikkeibp.co.jp/ts/article/aa0f/109247>.

(Continued)

*Primary Examiner* — Yuen Wong
(74) *Attorney, Agent, or Firm* — Locke Lord LLP (57) ABSTRACT

A construction machine controller includes: a first board operated by a construction machine embedded operating system; and a second board connected to the first board through a general purpose interface and operated by a general purpose PC operating system, wherein construction machine information acquired from a state acquisition unit inside a construction machine is input to the first board.

6 Claims, 7 Drawing Sheets (56) References Cited

U.S. PATENT DOCUMENTS

| | | |
|---|---|---|
| 2006/0025914 A1 | 2/2006 | Buschmann |
| 2008/0077786 A1 | 3/2008 | Pierce et al. |
| 2008/0312790 A1 | 12/2008 | Fey et al. |
| 2009/0132059 A1* | 5/2009 | Schultz .................. G05B 19/05 700/7 |

FOREIGN PATENT DOCUMENTS

| | | |
|---|---|---|
| JP | 07-013791 A | 1/1995 |
| JP | 2002-149212 A | 5/2002 |
| JP | 2003-036101 A | 2/2003 |
| JP | 2006-053713 A | 2/2006 |
| JP | 2006-059308 A | 3/2006 |
| JP | 2008-532836 A | 8/2008 |
| JP | 2010-053606 A | 3/2010 |
| JP | 2011-070496 A | 4/2011 |
| JP | 2012-076518 A | 4/2012 |
| JP | 4999262 B2 | 8/2012 |
| JP | 2012-201175 A | 10/2012 |
| WO | WO-2013/094006 A1 | 6/2013 |

OTHER PUBLICATIONS

"Five Ways to Build Flexibility into Industrial Applications with FPGAs", White Paper, Altera, Japan, Ltd., Feb. 2011, pp. 1-16, [searched on Oct. 7, 2014], via the Internet URL:<http://www.altera.co.jp/literature/wp/wp-01154-flexible-industrial> j.pdf.

"Guide on Technologies about T-Kernel, Section of AMP: Capability of "MP T-Kernel" for Multiprocessors", Yuichi Toyoyama, MONOist, ITmedia Inc., Oct. 21, 2006, (1/3)-(3/3) pages, [searched on Oct. 7, 2014], via the Internet URL:<http://monoist.atmarkit.co.jp/mn/articles/0610/21/news0> 12.html.

"LSI for Car Navigation Systems/Digital Dashboards Realizing the Next-Generation Automotive Terminal System on a single chip, MB86R01", Find vol. 25 No. 4, 2007, Fujitsu Kabushiki Kaisha, pp. 26-29 and English translation thereof.

International Search Report and Written Opinion dated Oct. 8, 2013, issued for PCT/JP2013/072218.

Office Action dated May 4, 2015, issued for the corresponding Canadian Patent Application No. 2,849,400.

* cited by examiner

VIEWED FROM X

CONSTRUCTION MACHINE CONTROLLER

FIELD

The present invention relates to a construction machine controller that is capable of performing processing involving a large processing load in parallel with processing requiring real-time performance, and easily performing the addition of the function involving a large processing load.

BACKGROUND

In recent years, electronization and computerization of construction machines including mining machines have advanced. In order to drive an engine mounted on a construction machine by an engine output corresponding to circumstances, electronic control using a controller is performed. Further, a controller for sensing an operating state of a construction machine by various sensors, generating information indicating the operating state from the sensed information, and executing wireless communication processing of the generated information is used. Along with such advancement and high-functionalization/multi-functionalization of electronic control, information processing, and wireless communication processing, it is required to mount a high-performance controller on a construction machine. The high performance of a controller can be achieved by improving the performance of an electronic component such as a numerical processor on which the arithmetic processing performance of the controller depends.

CITATION LIST

Patent Literature

Patent Literature 1: Japanese Unexamined Patent Application Publication No. 2010-53606

SUMMARY

Technical Problem

A controller mounted on a construction machine is required to have a function that is not provided in a conventional construction machine. For example, in a dump truck or the like, a function to monitor the existence of an obstacle around the dump truck using a plurality of cameras may be required. When providing such a periphery monitoring system in a dump truck, it is necessary for a controller to perform image processing on an image obtained by a plurality of cameras in addition to control processing in a conventional construction machine. However, since the image processing involves a large processing load, even a controller using a high-performance numerical processor may not ensure real-time performance of control processing in a conventional construction machine.

On the other hand, a controller of a construction machine has a construction machine embedded operating system (OS) that is peculiar to a construction machine. The construction machine embedded OS is an OS that has a function required for controlling the derricking of a vessel which is provided, for example, in a dump truck. Further, the OS itself is also constructed by a developer of the construction machine. The construction machine embedded OS achieves high real-time performance which ensures processing time within a certain range and compactness which enables an operation using a small amount of memory, and has high reliability and stability accumulated for a long period of time. When addition of a function such as a periphery monitoring system to a controller that uses such a special construction machine embedded OS is required, it is often difficult to technically cope with the function addition, and significant time for the development is disadvantageously required.

In Patent Literature 1, there is described an operating machine that has a control system improving even a development efficiency of a special-specification operating machine.

The present invention has been made in view of the above, and an object thereof is to provide a construction machine controller that is capable of performing processing involving a large processing load in parallel with processing requiring real-time performance, and easily performing the addition of the function involving a large processing load.

Solution to Problem

To solve the problem described above and achieve the object, a construction machine controller according to the present invention includes: a first board operated by a construction machine embedded operating system; and a second board connected to the first board through a general purpose interface and operated by a general purpose PC operating system, wherein construction machine information acquired from a state acquisition unit inside a construction machine is input to the first board.

Moreover, in the construction machine controller according to the above-described invention, each of the first board and the second board includes an internal power circuit converting source voltage supplied from a power source of the construction machine into a desired voltage.

Moreover, in the construction machine controller according to the above-described invention, the first board includes a storage unit, temporarily stores the construction machine information acquired during activation of the second board in the storage unit and transfers the construction machine information temporarily stored in the storage unit to the second board after the activation of the second board.

Moreover, in the construction machine controller according to the above-described invention, the first board and the second board are housed inside a same housing.

Moreover, the construction machine controller according to the above-described invention further includes an extended function processing board connected to the first board or the second board and performing predetermined processing.

Moreover, a construction machine controller according to the present invention includes: a first board operated by a construction machine embedded operating system; and a second board connected to the first board through a general purpose interface and operated by a general purpose PC operating system, wherein the first board and the second board are housed inside a same housing, each of the first board and the second board includes an internal power circuit converting source voltage supplied from a power source of a construction machine into a desired voltage, construction machine information acquired from a state acquisition unit inside the construction machine is input to the first board, and the first board includes a storage unit, temporarily stores the construction machine information acquired during activation of the second board in the storage unit and transfers the construction machine information temporarily stored in the storage unit to the second board after the activation of the second board.

According to the present invention, functions are shared by the first board which is operated by the construction machine embedded operating system and the second board which is connected to the first board through the general purpose interface and operated by the general purpose PC operating system. Therefore, it is possible to easily perform the addition of a function that does not require real-time performance and involves a large processing load.

DESCRIPTION OF EMBODIMENT

Hereinbelow, an embodiment of the present invention will be described with reference to the accompanying drawings. In this embodiment, a construction machine controller that is mounted on a dump truck which is one of construction machines will be described.

[Entire Configuration of Control System]

Figure 1:
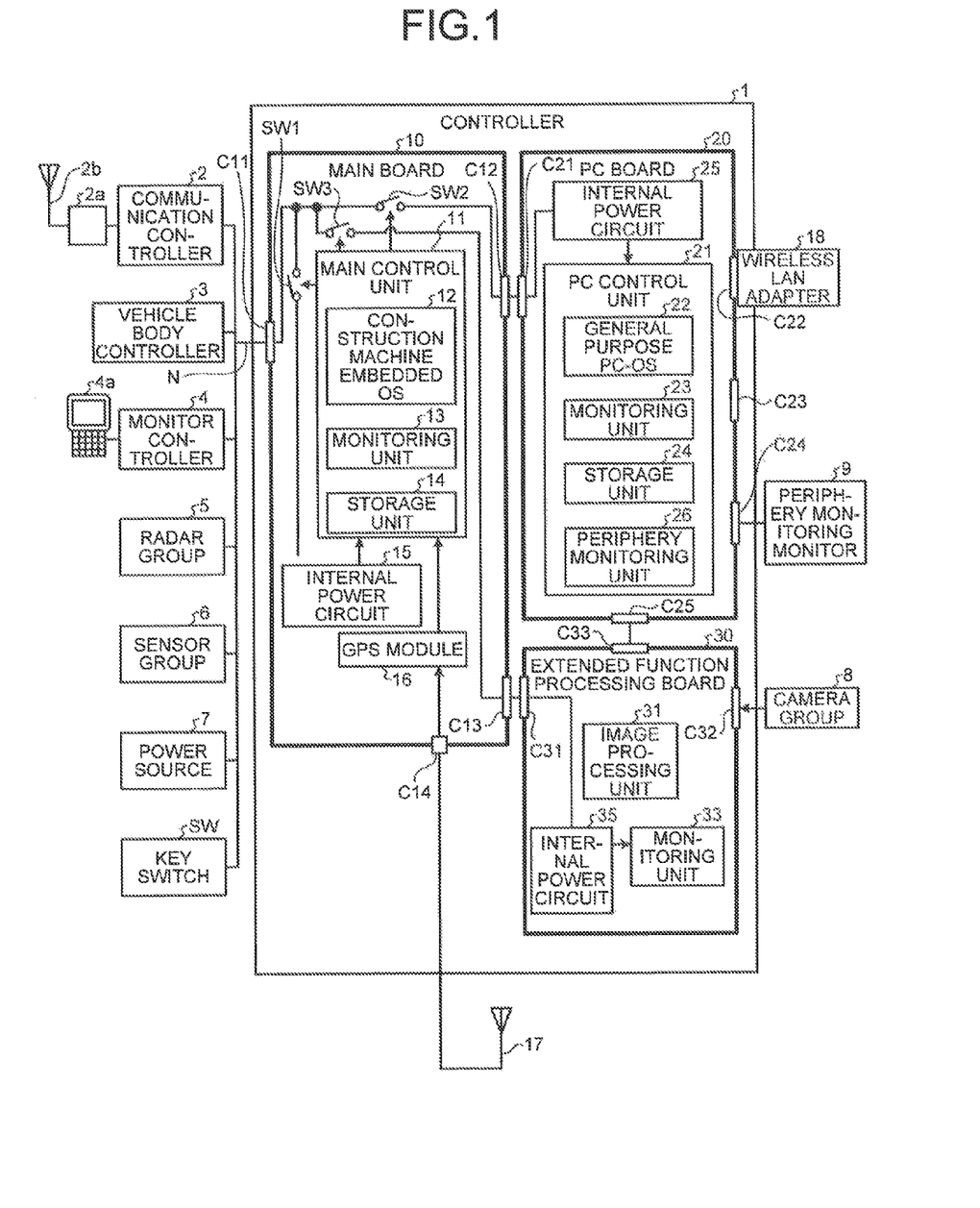
FIG. 1 is a block diagram illustrating a control system that is mounted on a dump truck which is one of construction machines.

FIG. 1 is a block diagram illustrating a control system that is mounted on a dump truck which is one of construction machines. As illustrated in FIG. 1, a controller 1 as the construction machine controller is connected to a CAN which is one of in-vehicle networks. A wire harness N illustrated in FIG. 1 is illustrated as a concept including the CAN, a communication line, a signal line, and a power line. Therefore, a communication controller 2, a vehicle body controller 3, a monitor controller 4, a radar group 5, a sensor group 6, a power source 7, and a key switch SW are connected to the wire harness N in the present embodiment.

The communication controller 2 is connected to an antenna 2b through a transceiver 2a, and performs transmission/reception of information with an external communication device. The information includes, for example, information containing construction machine information such as position information and operation information of the dump truck. The position information is information indicating the position of the dump truck sensed by a global positioning system (GPS) module 16 (described below).

The vehicle body controller 3 adjusts fuel that is injected to an engine by a fuel injection device (not illustrated) to control output of the engine. A monitor 4a is connected to the monitor controller 4. The monitor controller 4 performs control of input/output of various pieces of information such as information transmitted from the sensor group 6 and information input through the monitor 4a, and displays various pieces of information on the monitor 4a. The monitor 4a includes a liquid crystal panel and the like. For example, the travelling speed, the remaining amount of fuel, and warning information indicating abnormality in a device can be displayed on the monitor 4a.

The radar group 5 detects the relative position between an obstacle existing around the dump truck and the dump truck. For example, eight radars are provided in the radar group 5, and attached to the outer peripheral part of the dump truck. As each of the radars, an ultra wide band (UWB) radar having an azimuth of 80 degree (40 degree each in right and left) and a maximum detection distance of 15 m or more, for example, is used.

The sensor group 6 includes various sensors, for example, sensors detecting the engine speed, the water temperature of a radiator, the temperature of engine oil, and the like.

The power source 7 is, for example, a storage battery of 24 V DC. The key switch SW becomes a key-on state by an operation of a key (not illustrated) to thereby allow power supply from the power source 7 to electronic devices such as the controller 1, a headlight (not illustrated), and the like. Further, when the key is operated up to a position for starting the engine, a starter (not illustrated) is activated, and the engine is thereby started.

A camera group 8, a periphery monitoring monitor 9, and a GPS antenna 17 are connected to the controller 1. The camera group 8 is attached to the outer peripheral part of the dump truck in the same manner as the radar group 5. For example, eight cameras are provided in the camera group 8 so as to have a visual field range of 120 degree in the right-left direction (60 degree each in right and left) and 96 degree in the height direction. As each of the cameras, a charge-coupled device (CCD) camera can be used.

The periphery monitoring monitor 9 displays thereon a result of obstacle detection performed by the radar group 5 and a bird's-eye image that is processed by the controller 1 on the basis of an image taken by the camera group 8. In addition, when an obstacle is detected by the radar group 5, an alarm is output by generating sound or displaying a mark or the like that expresses warning on the periphery monitoring monitor 9.

[Detailed Configuration of Controller]

The controller 1 includes a main board 10 as a first board, a PC board 20 as a second board and an extended function processing board 30 as a third board. Thick lines illustrated in FIG. 1 indicate the external shapes of the main board 10, the PC board 20 and the extended function processing board 30. The main board 10 includes a main control unit 11. The main control unit 11 includes a construction machine embedded OS 12, a monitoring unit 13 and a storage unit 14. The construction machine embedded OS 12 is peculiar to a construction machine. When a construction machine is a dump truck, the construction machine embedded OS 12 is an embedded OS that has a function required for controlling the derricking of a vessel 45 (see FIG. 2) which is provided in a dump truck 41. When the controller 1 is applied to a hydraulic excavator, the construction machine embedded OS 12 is an embedded OS that has a function required for controlling the operation of an operating machine. The OS itself is also constructed by a developer. The construction machine embedded OS 12 achieves high real-time performance which ensures processing time within a certain range and compactness which enables an operation using a small amount of memory.

On the other hand, the personal computer (PC) board 20 includes a PC control unit 21. The PC control unit 21 includes a general purpose PC-OS 22, a monitoring unit 23, a storage unit 24, and a periphery monitoring unit 26. The general purpose PC-OS 22 is a general purpose OS that has abundant functions including an unnecessary function for a construction machine. The unnecessary function includes, for example, a function relating to transmission/reception of e-mails. An existing OS is used as the OS itself. A specific OS is Windows (registered trademark). Therefore, many developers can utilize this OS, and there are abundant human resources. Further, there are also abundant available existing applications. When adding a function that does not require real-time performance and involves a large processing load, the PC control unit 21 can achieve the function addition merely by adding an application. The periphery monitoring unit 26 is one of image processing applications. An application that is added for being executed in the PC control unit 21 may be a function involving a small processing load.

The general purpose PC-OS 22 has software design that can execute abundant functions as described above and has general purpose properties. Therefore, it is necessary to activate all of the functions provided therein, and it takes time for the activation. The construction machine embedded OS 12 of the main board 10 has software design that is limited to a necessary function as described above. Therefore, when activating the construction machine embedded OS 12, the activation is completed within a short time. In other words, the PC board 20 is activated later than the main board 10.

The extended function processing board 30 includes an image processing unit 31. The extended function processing board 30 performs image processing that branches from processing performed by the periphery monitoring unit 26. That is, the extended function processing board 30 is a dedicated board that takes a role of helping image processing performed by the periphery monitoring unit 26. The image processing unit 31 is implemented, for example, by a field-programmable gate array (FPGA) and a memory (video random access memory (VRAM), for example). More specifically, the extended function processing board 30 transmits image data obtained by preforming coordinate transformation and superimposition processing on an image taken by the camera group 8 to the PC board 20.

[Connection Configuration of Controller]

The main board 10 includes connectors C11 which connect the wire harness N thereto, a USB interface connector C12 which connects the PC board 20 thereto, a connector C13 which connects the extended function processing board 30 thereto, and a connector C14 which connects the GPS antenna 17 and the GPS module 16 to each other. The main board 10 and the PC board 20 are connected to each other through the general purpose USB interface. Therefore, it is easy to replace the PC board 20 with a new PC board. Further, since the main board 10 has the USB interface, it is easy to connect the main board 10 to an external general purpose PC or the like, and the development of the main board 10 becomes easy.

The PC board 20 includes a USB interface connector C21 which connects the main board 10 thereto, a USB interface connector C22 which is connected to the outside, connectors C23 which connect an external LAN cable thereto, and a connector C24 which connects a monitor cable between the connector C24 and the periphery monitoring monitor 9 thereto. In order to connect the extended function processing board 30 to the PC board 20, the PC board 20 includes a connector C25 of peripheral components interconnect (PCI) express standard which is capable of transferring various pieces of information with high speed. Since a USB compatible device and a LAN cable can be connected to the PC board 20, it is easy to access the PC board 20 from the outside. As a result, debug processing or the development becomes easy, and download of a large amount of data stored in the storage unit 24 inside the PC board 20 also becomes easy. The PC board 20 can connect thereto a USB compatible device and a LAN cable, and is therefore versatile. Further, the PC board 20 does not require a dedicated tool for downloading a large amount of data stored in the storage unit 24.

A wireless LAN adapter 18 is connected to the connector C22. A large amount of data stored in the storage unit 24 inside the PC board 20 can be downloaded to the outside through the wireless LAN adapter 18.

The extended function processing board 30 includes a connector C31 which connects the main board 10 thereto, a connector C33 of PCI express standard which connects the PC board 20 thereto, and a connector C32 which connects the camera group 8 thereto. The PC board 20 and the extended function processing board 30 can be connected to each other using a flat cable of PCI express standard, thereby making it possible to perform high-speed transfer processing of various pieces of information. Therefore, the extended function processing board 30 sufficiently serves as an accelerator of the periphery monitoring unit 26.

[Power Connection Configuration of Controller]

A power line of 24 V DC is input to the main board 10 from the power source 7 through the connectors C11. The power line is connected to an internal power circuit 15 through a power switch SW1. The power switch SW1 is mounted on the main board 10. As the power switch SW1, a metal-oxide-semiconductor (MOS) transistor can be used. Also, a MOS transistor can be used as each of switches SW2 and SW3. That is, a discrete component can be used as a power switch. The internal power circuit 15 performs voltage conversion to different voltages of, for example, 5 V DC, 3.3 V DC and 1.2 V DC to generate respective internal power voltages. These internal power voltages are used in the main control unit 11 and the like inside the main board 10. A state of power supply performed by the internal power circuit 15 is monitored by the monitoring unit 13.

The power line of 24 V DC through the connectors C11 is directly connected to the PC board 20 through the power switch SW2 and the connectors C12 and C21. The power switch SW2 is mounted on the main board 10. The power line input to the PC board 20 is connected to an internal power circuit 25. The internal power circuit 25 performs voltage conversion to a voltage of, for example, 5 V DC to generate an internal power voltage. The internal power voltage is used in the PC control unit 21 and the like inside the PC board 20. A state of power supply performed by the internal power circuit 25 is monitored by the monitoring unit 23.

The power line of 24 V DC through the connectors C11 is connected to the extended function processing board 30 through the power switch SW3, and the connectors C13 and C31. The power switch SW3 is mounted on the main board 10. The power line input to the extended function processing board 30 is connected to an internal power circuit 35. The internal power circuit 35 performs voltage conversion to a voltage of, for example, 5 V DC to generate an internal power voltage. The internal power voltage is used in the image processing unit 31 and the like inside the extended function processing board 30. A state of power supply performed by the internal power circuit 35 is monitored by a monitoring unit 33.

The respective power circuits of the main board 10, the PC board 20 and the extended function processing board 30 are connected to each other through the power line of 24 V before being voltage-converted. Since the internal power circuits 15, 25 and 35 each of which converts source voltage supplied from the power source 7 into a desired voltage are respectively provided in the main board 10, the PC board 20 and the extended function processing board 30, it is not necessary to provide a new power supply interface or a new voltage conversion circuit when replacing the PC board 20 or the extended function processing board 30 with new one. For example, assuming that an internal power circuit is provided only in the main board 10 and functions of the power supply circuits of the PC board 20 and the extended function processing board 30 are integrated into the internal power circuit of the main board 10, when the PC board 20 is replaced with new one along with the renewal thereof and change of voltage used in the PC board 20 thereby occurs, it is necessary to change the internal power circuit of the main board 10 to an internal power circuit corresponding to the changed voltage. As a result, new board development, operation confirmation, and the like are required. Therefore, when the internal power circuits 15, 25 and 35 are provided in the respective boards as in the present embodiment, it is possible to easily cope with specification change in the future.

[Periphery Monitoring Processing]

In the dump truck, information regarding an obstacle detected by the radar group 5 which is arranged in the outer peripheral part of the dump truck is transmitted to the main board 10 from the wire harness N, and then sent to the periphery monitoring unit 26 of the PC board 20 through a signal line (not illustrated) inside the main board 10 and connectors C12 and C21. The information regarding an obstacle is information indicating the distance between the dump truck and the obstacle or information indicating the position of the obstacle, that is, information regarding the relative position between the dump truck and the obstacle. On the other hand, an image taken by the camera group 8 which is arranged on the outer peripheral part of the dump truck is sent to the extended function processing board 30. The image processing unit 31 generates a bird's-eye image which can monitor the entire circumference of the dump truck. For example, in order to generate the bird's-eye image, each taken image is first converted to an image viewed from a predetermined virtual view point located above the dump truck. Specifically, image conversion in which each image is projected on a predetermined virtual projection surface corresponding to the ground from a predetermined virtual view point is performed. Then, projected images are synthesized corresponding to imaging areas to thereby generate a bird's-eye image around the dump truck. Thereafter, the image processing unit 31 sequentially sends out bird's-eye images to the periphery monitoring unit 26 via the connectors C33 and C25. The periphery monitoring unit 26 gives a command to the image processing unit 31 so as to generate a bird's-eye image on which a result of obstacle detection performed by the radar group 5 (a mark indicating the position of an obstacle, for example) is superimposed, and display-outputs the generated image data on the periphery monitoring monitor 9. Further, when the periphery monitoring unit 26 determines from the result of detection performed by the radar group 5 that there is an obstacle, the periphery monitoring unit 26 outputs an alarm by, for example, generating sound from the periphery monitoring monitor 9 or displaying a mark expressing warning on a bird's-eye image. The periphery monitoring unit 26 displays a bird's-eye image that includes information indicating the position at which an obstacle is determined to be located from a result of obstacle detection by the radar group 5 on the periphery monitoring monitor 9 so that an operator of the dump truck can visually recognize the existence and the position of the obstacle.

In this embodiment, the periphery monitoring processing which is a function involving a large processing load is added as described above. However, by using the PC board 20 which has the general purpose PC-OS 22 and the extended function processing board 30 which can perform high-speed image processing by FPGA, there is no influence on processing executed by the main board 10, namely, processing requiring real-time performance. The processing requiring real-time performance is, for example, processing in which the sensor group 6 grasps abnormality that occurs immediately after turning on the key switch SW in order to activate the dump truck and the abnormality is notified to the operator as an alarm, or processing in which abnormality in an engine or the like grasped by the sensor group 6 when the dump truck is in operation is promptly notified to the operator as an alarm. That is, processing involving a large processing load is not imposed on the main board 10, and the main board 10 executes processing involving a small processing load while ensuring real-time performance. Roles are divided corresponding to the size of processing loads between the main board 10 and the PC board 20 or the extended function processing board 30.

[Arrangement Position of Controller]

Figure 2:
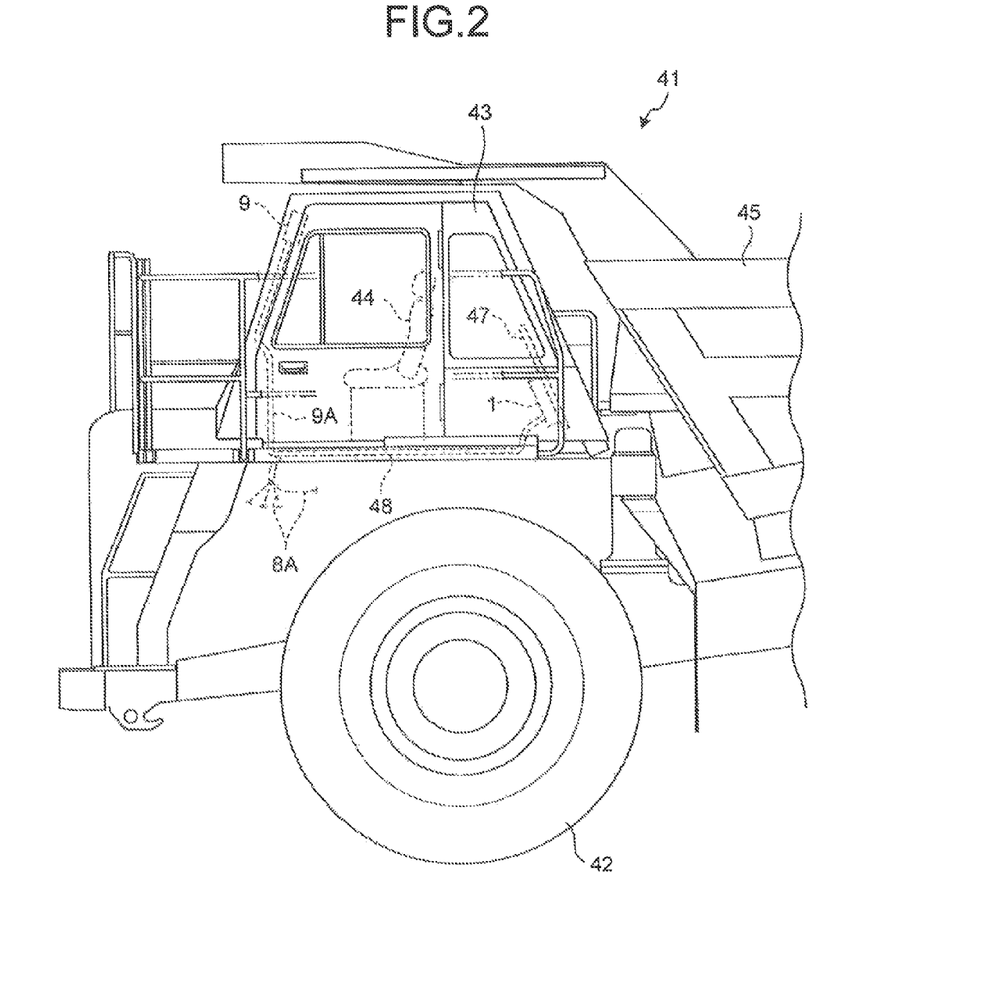
FIG. 2 is a side view illustrating a vehicle front part of the dump truck.

FIG. 2 is a side view illustrating a vehicle front part of the dump truck. On the front side of the dump truck 41, a cab 43 in which an operator rides is provided at a position above front wheels 42. An operator seat 44 indicated by a dotted line, and apparatuses and devices (not illustrated) for performing an driving operation for the dump truck 41 and a derricking operation for the vessel 45 for loading thereon crushed stones and the like are placed inside the cab 43. Further, as indicated by a dotted line, the periphery monitoring monitor 9 is placed at an upper front position inside the cab 43. The periphery monitoring monitor 9 may be placed at another position inside the cab 43 as long as the visibility of an operator can be ensured. An attachment panel 47 which is made of metal is provided at a lower rear position inside the cab 43. The controller 1 is attached to the attachment panel 47.

The periphery monitoring monitor 9 and the controller 1 are connected to each other by a monitor cable 9A. One end of an image signal cable 8A is connected to the controller 1. The other end of the image signal cable 8A is connected to the camera group 8. The monitor cable 9A and the image signal cable 8A are integrally formed as a harness 48.

[Housing Case of Controller]

Figure 3:
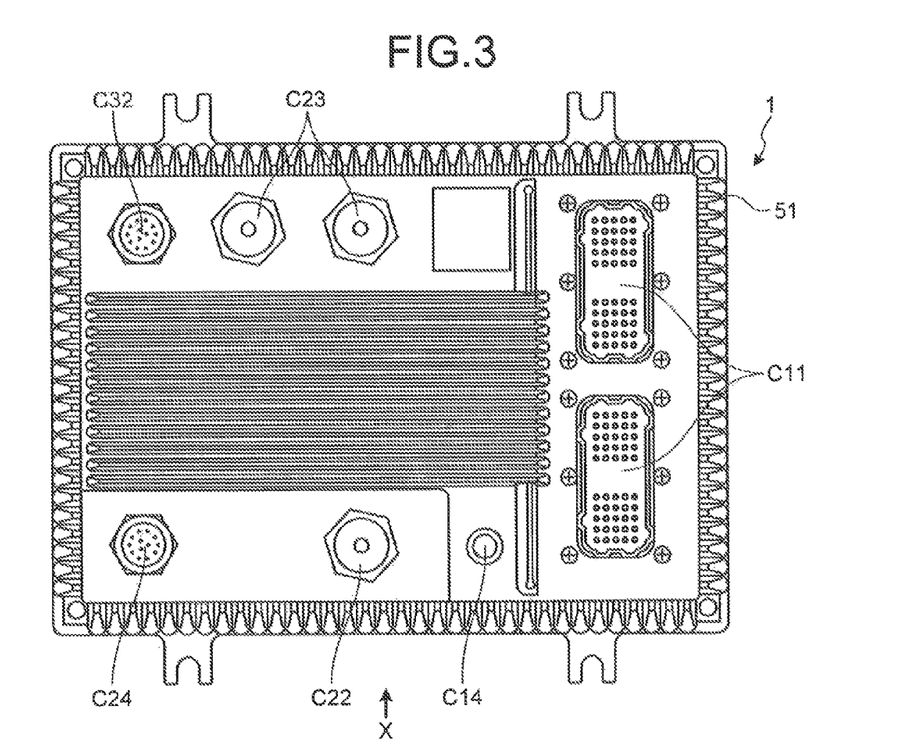
FIG. 3 is a plan view of a controller.
Figure 4:
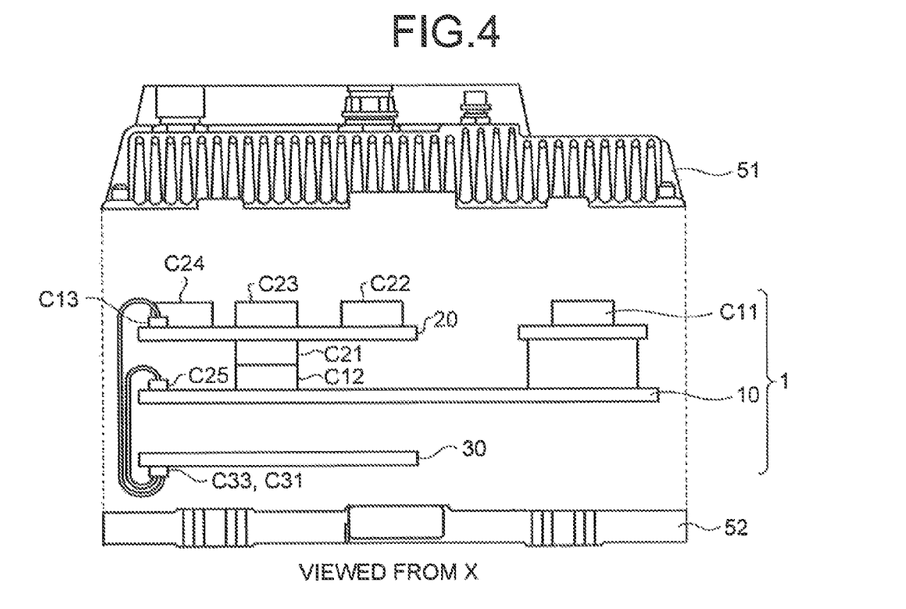
FIG. 4 is an exploded side view of the controller.

FIG. 3 is a plan view of the controller 1, and illustrates a state where the main board 10, the PC board 20, the extended function processing board 30, and the like are housed in a case (an upper case 51 and a lower cover 52) which is a housing of the controller 1. FIG. 4 is an exploded side view of the controller 1, and illustrates the controller 1 viewed from an X direction illustrated in FIG. 3. That is, FIG. 4 illustrates a state where the main board 10 and the like are housed inside the case (the upper case 51 and the lower cover 52) which forms the housing of the controller 1. As illustrated in FIG. 3 and FIG. 4, the main board 10, the PC board 20, and the like which constitute the controller 1 are integrally housed inside an internal space formed by the upper case 51 and the lower cover 52. In other words, the main board 10 and the PC board 20 are housed in the same housing. In the present embodiment, the extended function processing board 30 is also housed in the same housing.

Each of the upper case 51 and the lower cover 52 is formed of aluminum having high thermal conductivity. A radiator fin is provided in each of the upper case 51 and the lower cover 52.

In the controller 1, the PC board 20 is provided above the main board 10, and the extended function processing board 30 is provided below the main board 10. The connector C12 of the main board 10 and the connector C21 of the PC board 20 are directly connected to each other by connector connection. The two connectors C11 and the connector C14 of the main board 10, the two connectors C23, the connector C22 and the connector C24 of the PC board 20 and the connector C32 of the extended function processing board 30 are directly exposed on the surface of the upper case 51. The connector C32 is connected to the extended function processing board 30 through a cable. The connector C25 of the PC board 20 and the connector C33 of the extended function processing board 30 are connected to each other through a flat cable as described above. The connector C13 of the main board 10 and the connector C31 of the extended function processing board 30 are connected to each other through a cable. Spacers (not illustrated) are arranged between the PC board 20 and the main board 10 and between the main board 10 and the extended function processing board 30 so as to fix them.

[Start-up Processing of Controller]

Figure 5:
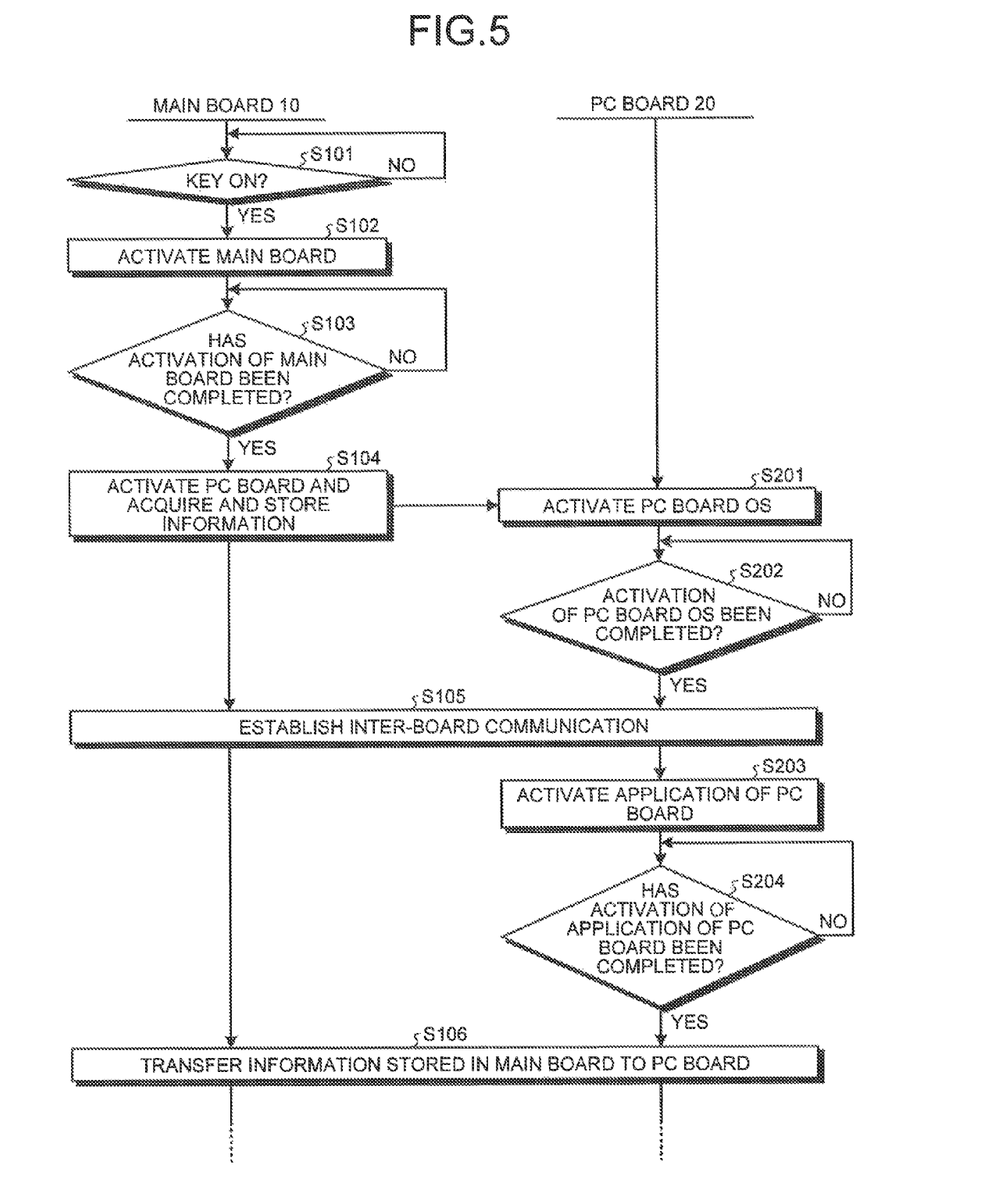
FIG. 5 is a flow chart illustrating the procedure for start-up processing of the controller.

Next, the procedure for start-up processing of the controller 1 will be described with reference to FIG. 5. First, the main board 10 determines whether or not the key switch SW is operated by an operator, and thereby turned on (step S101). When the key switch SW is turned on, an electric signal is transmitted from the key switch SW to the main board 10 through the signal line, and the main board 10 receives the electric signal and thereby recognizes that the key switch SW has been turned on. When the key switch SW is turned on (Yes at step S101), the main board 10 turns on the switch SW1 to supply power from the power source 7 to the main board 10, and the main board 10 is thereby activated (step S102). A backup power source (not illustrated) is connected to each of the main board 10 and the PC board 20.

Then, it is determined whether or not the activation of the main board 10 has been completed (step S103). Whether or not the activation of the main board 10 has been completed is determined by determining whether the switch SW2 and the switch SW3 of the main board 10 are sequentially turned on. After turning on the switch SW1, the main board 10 sequentially turns on the switch SW2 and the switch SW3. If these switches are not turned on, it is determined that the activation of the main board 10 has not been completed (No at step S103). When these switches are sequentially turned on, it is determined that the activation of the main board 10 has been completed (Yes at step S103). After determining that the activation of the main board 10 has been completed (Yes at step S103), as described above, the main board 10 acquires various pieces of information input through the wire harness N or the like and temporarily stores the acquired information in the storage unit 14 while turning on the switch SW2 to supply power to the PC board 20 to thereby activate the PC board 20 (step S104). The information is construction machine information that is acquired by a state acquisition unit such as the sensor group 6 and the GPS module 16 as illustrated in FIG. 1. The information includes information that is sensed and transmitted by the sensor group 6 which is connected to the controller 1 through the wire harness N and position information that is transmitted from the communication controller 2. Further, the vehicle body controller 3 or the like may serve as the state acquisition unit, failure information detected by the vehicle body controller 3 or the like may be transmitted to the controller 1 through the wire harness N, and the failure information may be stored in the storage unit 14 as the construction machine information.

The construction machine information is stored in the storage unit 14 of the main board 10, and time stamps are given to data groups of construction machine information at a time interval of, for example, 100 msec. The main board 10 is provided with a first in first out (FIFO) function for giving a time stamp. The time stamp is time that can be obtained by a clock IC (not illustrated) of the main board 10. Therefore, a plurality of data groups are generated until the activation of the PC board 20 is completed (within several tens of seconds). As described above, time stamps are given to the respective data groups, and the data groups are stored in the storage unit 14. The data groups are transferred to the storage unit 24 of the PC board 20 through the connectors C12 and C21 after completing the activation of the PC board 20. In the FIFO function, data groups are sequentially taken out from the storage unit 14 in the stored order. However, the data groups are not taken out until the activation of the PC board 20 is completed. A data group with a time stamp stored in the storage unit 24, namely, construction machine information can be downloaded to the outside through the connector C22. Since the construction machine information includes a time stamp, it is possible to know, for example, what kind of error occurs and when the error occurs. As a result, it is possible to identify the cause of abnormality.

In the PC board 20, power is supplied as described above, and the PC board OS (general purpose PC-OS 22) is thereby activated (step S201). Then, it is determined whether or not the activation of the PC board OS has been completed (step S202). When the activation of the PC board OS has been completed (Yes at step S202), inter-board communication through the USB interface is established between the main board 10 and the PC board 20 (step S105).

After establishing the inter-board communication, an application is activated in the PC board 20 (step S203). In this embodiment, the periphery monitoring unit 26 as an image processing application is activated. Then, in the PC board 20, it is determined whether or not the activation of the application has been completed (step S204). When the activation of the application has been completed (Yes at step S204), information such as construction machine information temporarily stored in the main board 10 is transferred to the PC board 20 (step S106). Thereafter, each of the main board 10 and the PC board 20 performs specific processing. Not only at the time of initial activation, but also at the time of reactivation, processing similar to the steps S102 to S106 described above is performed.

In this embodiment, as described above, the main board 10 which has been activated prior to the PC board 20 temporarily stores information such as construction machine information which can be acquired until the activation of the PC board 20 is completed, and transfers the temporarily stored information to the PC board 20 after the activation of the PC board 20 is completed. The temporarily stored information is information acquired through the wire harness N or the like as described above, and includes, for example, information detected by the sensor group 6. As a result, the PC board 20 can reliably acquires information that is acquired until the activation of the PC board 20 is completed. Therefore, it is possible to perform high-quality trend analysis of a vehicle state or the like. For example, it is possible to fully grasp an abnormal condition that occurs only immediately after turning on the key switch.

[Abnormality Monitoring Processing of Controller]

Next, abnormality monitoring processing of the controller 1 will be described. First, processing by the monitoring units 13, 23 and 33 will be described. The monitoring unit 13 of the main board 10 monitors, as power monitoring, source voltage of the internal power circuit 15 to monitor whether or not power abnormality occurs. Further, the monitoring unit 13 monitors, as system monitoring, whether or not a heartbeat pulse (also referred to as a watchdog pulse) output from a CPU (not illustrated) of the main control unit 11 is normally output. The heartbeat pulse is a pulse signal output from the CPU at a constant period. When a pulse signal is output at the constant period, it is indicated that the CPU is operating normally. When power abnormality occurs, or when the heartbeat pulse is not normal, the monitoring unit 13 temporarily turns off the two power switches SW2 and SW3 excepting the power switch SW1 to thereby stop the supply of power to the PC board 20 and the extended function processing board 30. Thereafter, the monitoring unit 13 turns on the power switches SW2 and SW3 to perform reactivation (reset) processing.

The monitoring unit 23 of the PC board 20 monitors source voltage of the internal power circuit 25 to monitor whether or not power abnormality occurs. The PC control unit 21 outputs a heartbeat pulse to the main board 10, and the monitoring unit 13 monitors whether or not the heartbeat pulse is normally output. Further, the monitoring unit 33 of the extended function processing board 30 monitors source voltage of the internal power circuit 35 as well as monitors whether or not power abnormality occurs. When power abnormality has occurred, the monitoring unit 33 outputs a signal indicating the abnormality to the monitoring unit 13. That is, the monitoring unit 33 notifies the monitoring unit 13 of the occurrence of abnormality. When the monitoring unit 23 or 33 determines the occurrence of power abnormality and notifies the monitoring unit 13 of the occurrence of power abnormality, or when the monitoring unit 13 determines that a heartbeat pulse is not normally output from the PC control unit 21, the monitoring unit 13 temporarily turns off the power switches SW2 and SW3, and thereafter turns on the power switches SW2 and SW3 to perform reactivation (reset) processing. In the present embodiment, the extended function processing board 30 does not have a function to output a heartbeat pulse. However, the extended function processing board 30 may have a function to output a heartbeat pulse, and whether the extended function processing board 30 is normally operating may be monitored.

In the extended function processing board 30, a numerical value is embedded in image data to be sent to the PC board 20. The numerical value is counted up every time when updating the image, and the counted-up numerical value is embedded. The monitoring unit 23 monitors a numerical value in image data sent from the extended function processing board 30. When updating of the numerical value stops, the monitoring unit 23 determines that system abnormality occurs in the extended function processing board 30. When system abnormality occurs, the monitoring unit 23 stops the output of a heartbeat pulse that is sent from the PC control unit 21 to the main board 10. Accordingly, the monitoring unit 13 determines that system abnormality occurs, and temporarily turns off the power switches SW2 and SW3. Thereafter, the monitoring unit 13 turns on the power switches SW2 and SW3 to perform reactivation (reset) processing.

When an attempt of the reactivation by turning on the power switches SW2 and SW3 fails, the monitoring unit 13 again executes the reactivation. When predetermined times of attempts of the reactivation fail, the monitoring unit 13 stops the reactivation. When the monitoring unit 13 determines that power abnormality or system abnormality occurs, the monitoring unit 13 may turn off at least one of the switches SW2 and SW3 to stop power supply to the PC board 20 or the extended function processing board 30 without performing the reactivation processing.

During performing reactivation due to the occurrence of power abnormality or system abnormality, or when the reactivation fails, the monitoring unit 13 outputs a signal for performing predetermined display that indicates the abnormal condition to the periphery monitoring monitor 9 as a display device. Then, the periphery monitoring monitor 9 displays the occurrence of the abnormal condition on the basis of the signal, for example, by making the entire screen black so as not to display a bird's-eye image thereon or warning by a buzzer. When power abnormality or system abnormality occurs, the monitoring unit 13 may displays the occurrence of the abnormal condition by displaying an error on a liquid crystal panel of the monitor 4*a* through the monitor controller 4. Further, an alarm lamp as a display device may be provided in a dashboard (not illustrated) located in front of the operator seat 44 inside the cab 43, and, when power abnormality or system abnormality occurs, the alarm lamp may be lighted or flashed to thereby notify an operator of the occurrence of the abnormality. Further, by lighting or flashing the alarm lamp, an operator may be notified that the controller 1 is in reactivation or the reactivation fails. The number of alarm lamps is not limited to one. A plurality of alarm lamps may be provided, or alarm lamps having different colors may be provided, thereby notifying an operator of the state of the controller 1 with excellent visibility.

Figure 6:
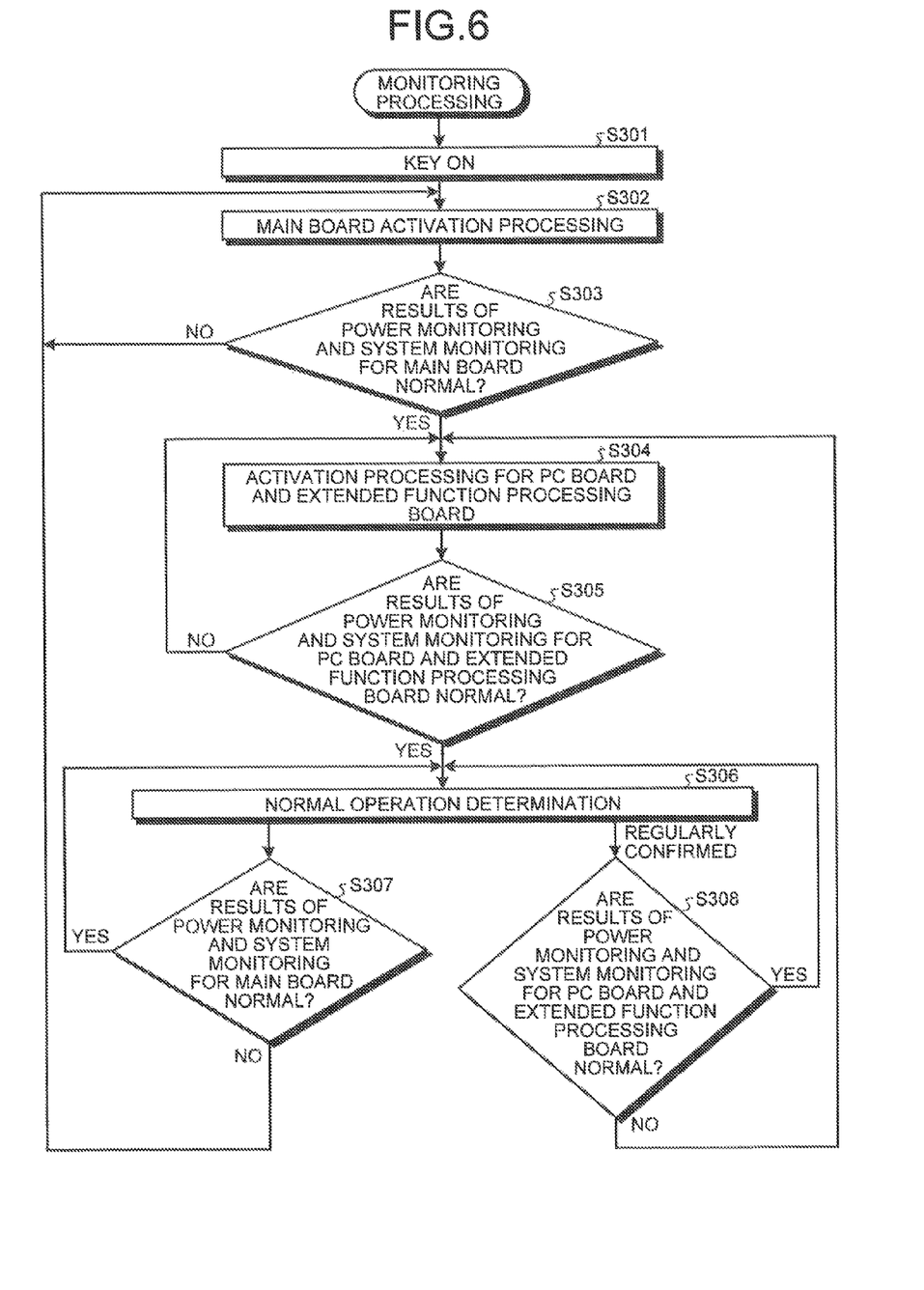
FIG. 6 is a flow chart illustrating the procedure for abnormality monitoring processing of the controller.

Next, the procedure for abnormality monitoring processing of the controller 1 will be described with reference to FIG. 6. First, an operator turns on the key switch SW (step S301). Accordingly, activation processing for the main board 10 is preformed (step S302). Then, the monitoring unit 13 determines whether or not results of power monitoring and system monitoring for the main board 10 are normal (step S303). When at least one of the result of power monitoring and the result of system monitoring for the main board 10 is abnormal (No at step S303), the process shifts to step S302 to again perform the activation processing for the main board 10.

On the other hand, the results are normal (Yes at step S303), the monitoring unit 13 then performs activation processing for the PC board 20 and the extended function processing board 30 (step S304). Then, the monitoring unit 13 determines whether or not results of presence/absence of power abnormality (power monitoring) and presence/absence of system abnormality (system monitoring) for each of the PC board 20 and the extended function processing board 30 are normal (step S305). When at least one of the result of power monitoring and the result of system monitoring is abnormal (No at step S305), the process shifts to step S304 to perform reactivation processing for the PC board 20 and the extended function processing board 30. Also in the monitoring unit 23, information indicating whether or not the results of presence/absence of power abnormality (power monitoring) and presence/absence of system abnormality (system monitoring) for each of the PC board 20 and the extended function processing board 30 are normal is transmitted to the monitoring unit 13.

On the other hand, when all of the result of power monitoring and the result of system monitoring for each of the PC board 20 and the extended function processing board 30 are normal (Yes at step S305), the monitoring unit 13 determines that the controller 1 is normally operating (step S306). Then, the monitoring unit 13 determines whether or not results of power monitoring and system monitoring for the main board 10 are normal (step S307), and determines whether or not results of power monitoring and system monitoring for each of the PC board 20 and the extended function processing board 30 are normal (step S308). When at least one of the result of power monitoring and the result of system monitoring for the main board 10 is abnormal (No at step S307), the process shifts to step S302 to perform activation processing for the main board 10. When both of the result of power monitoring and the result of system monitoring are normal (Yes at step S307), the process shifts to step S306. On the other hand, when the monitoring unit 13 determines that at least one of the result of power monitoring for the PC board 20, the result of power monitoring for the extended function processing board 30, the result of system monitoring for the PC board 20, and the result of system monitoring for the extended function processing board 30 is abnormal (No at step S308), the process shifts to step S304 to perform reactivation processing for the PC board 20 and the extended function processing board 30. Further, when all of the result of power monitoring and the result of system monitoring for each of the PC board 20 and the extended function processing board 30 are normal (Yes at step S308), the process shifts to step S306.

Although the extended function processing board 30 is provided in the above embodiment, the present invention is not limited thereto. The extended function processing board 30 may be omitted. In this case, an image taken by the camera group 8 is input to the PC board 20, and the periphery monitoring unit 26 performs the same processing as that performed by the image processing unit 31. Further, the periphery monitoring unit 26 may perform periphery monitoring processing by using only an image taken by the camera group 8 without providing the radar group 5.

Figure 7:
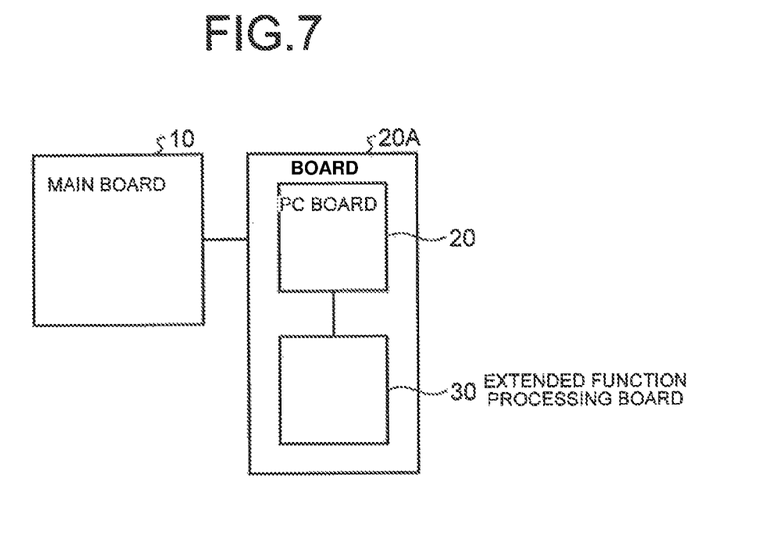
FIG. 7 is a block diagram illustrating the connection configuration of a modified example of the controller.
Figure 8:
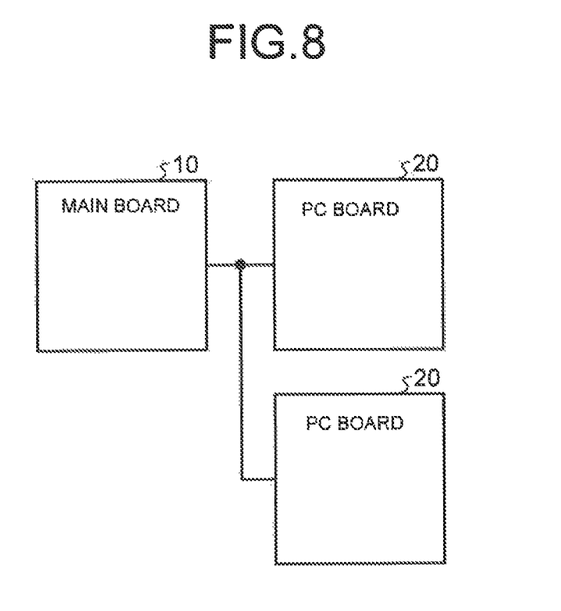
FIG. 8 is a block diagram illustrating the connection configuration of a modified example of the controller.
Figure 9:
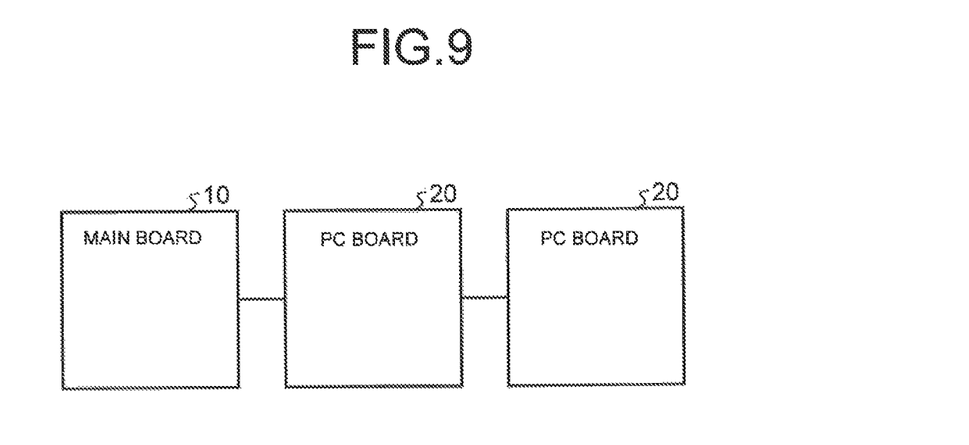
FIG. 9 is a block diagram illustrating the connection configuration of a modified example of the controller.

As illustrated in FIG. 7, the PC board 20 and the extended function processing board 30 may be formed as a single board 20A. Further, as illustrated in FIG. 8, a plurality of PC boards 20 may be connected to the main board 10. Further, as illustrated in FIG. 9, a new PC board 20 may be connected to the PC board 20.

In the above embodiment, the PC board 20 and the extended function processing board 30 mainly perform image processing. However, the present invention is not limited thereto, and processing regarding another application may be performed. For example, data of the temperature of cooling water for cooling the engine (not illustrated) is acquired by a temperature sensor, and stored as a trend in a predetermined storage unit. Then, the PC board 20 performs analysis of the trend to obtain the load condition of the engine, and thereby presumes whether or not failure of the engine will occur.

In the above embodiment, a dump truck has been described as an example of a construction machine. However, the present invention is not limited thereto, and another construction machine such as a hydraulic excavator and a wheel loader may also be used. For example, the controller 1 of the above embodiment can be used in an excavator such as a hydraulic excavator that enables computerized construction. In this case, information acquired by the main board 10 such as information received by two GPS antennas 17 and posture information detected by an inclination sensor, a gyro sensor, or the like which is provided in the hydraulic excavator is transmitted to the PC board 20, and the position and the direction of the hydraulic excavator (vehicle position information) are calculated. On the other hand, in order to obtain the three-dimensional position information of a blade tip of a bucket which is attached to an operating machine of the hydraulic excavator, the extension position information of the operating machine (the amount of stroke of a hydraulic cylinder attached to the operating machine) is acquired from the sensor group 6 which includes a stroke sensor and the like, and transmitted to the PC board 20. Then, the blade tip of the operating machine may be automatically controlled on the basis of the vehicle position information, the extension position information of the operating machine, and the three-dimensional position information of the blade tip of the bucket calculated using these pieces of information. By applying the controller 1 described in the above embodiment to such a hydraulic excavator that enables computerized construction, it is possible to reliably execute processing involving a large processing load in parallel with processing requiring real-time performance. Further, it is also easy to newly add a function involving a large processing load to the hydraulic excavator.

REFERENCE SIGNS LIST

1 CONTROLLER
2 COMMUNICATION CONTROLLER
2b ANTENNA
2a TRANSCEIVER
3 VEHICLE BODY CONTROLLER
4 MONITOR CONTROLLER
4a MONITOR
5 RADAR GROUP
6 SENSOR GROUP
7 POWER SOURCE
8 CAMERA GROUP
8A IMAGE SIGNAL CABLE
9A MONITOR CABLE
9 PERIPHERY MONITORING MONITOR
10 MAIN BOARD
11 MAIN CONTROL UNIT
12 CONSTRUCTION MACHINE EMBEDDED OS
13, 23, 33 MONITORING UNIT
14, 24 STORAGE UNIT
15, 25, 35 INTERNAL POWER CIRCUIT
16 GPS MODULE
17 GPS ANTENNA
18 WIRELESS LAN ADAPTER
20 PC BOARD
21 PC CONTROL UNIT
22 GENERAL PURPOSE PC-OS
26 PERIPHERY MONITORING UNIT
30 EXTENDED FUNCTION PROCESSING BOARD
31 IMAGE PROCESSING UNIT
41 DUMP TRUCK
42 FRONT WHEEL
43 CAB
44 OPERATOR SEAT
45 VESSEL
47 ATTACHMENT PANEL
48 HARNESS
51 UPPER CASE
52 LOWER COVER
C11, C12, C14, C21 to C25, C13, C31 to C33 CONNECTOR

N WIRE HARNESS
SW KEY SWITCH
SW1, SW2, SW3 POWER SWITCH

The invention claimed is:

1. A construction machine controller comprising:
a first board performing control processing limited to a necessary function of an operation of a construction machine by a construction machine embedded operating system, the control processing requiring real-time performance;
a second board connected to the first board through a general purpose interface and operated by a general purpose personal computer (PC) operating system, the second board performing another control processing that does not require real-time performance and that is not limited to the necessary function of the operation of the construction machine performed by the first board;
a first controller of the first board configured to perform power monitoring of the first board and system monitoring of the first board in response to an activation of the construction machine, wherein the first controller further configured to perform activation processing of the first board in response to a signal that the power monitoring and the system monitoring of the first board are normal; and
a second controller of the second board configured to perform power monitoring of the second board and system monitoring of the second board in response to the activation processing of the first board, wherein the second controller further configured to perform activation processing of the second board in response to a signal that the power monitoring and the system monitoring of the second board are normal, wherein construction machine information acquired from a state acquisition unit inside the construction machine is inputted to the first board.

2. The construction machine controller according to claim 1, wherein each of the first board and the second board includes an internal power circuit converting source voltage supplied from a power source of the construction machine into a desired voltage.

3. The construction machine controller according to claim 1, wherein the first board includes a storage unit, temporarily stores the construction machine information acquired during the activation processing of the second board in the storage unit and transfers the construction machine information temporarily stored in the storage unit to the second board after the activation processing of the second board.

4. The construction machine controller according to claim 1, wherein the first board and the second board are housed inside a same housing.

5. The construction machine controller according to claim 1, further comprising an extended function processing board connected to the first board or the second board, wherein the extended function processing board performs predetermined processing.

6. A construction machine controller comprising:
a first board performing control processing limited to a necessary function of an operation of a construction machine by a construction machine embedded operating system, the control processing requiring real-time performance;
a second board connected to the first board through a general purpose interface and operated by a general purpose personal computer (PC) operating system, the second board performing another control processing that does not require real-time performance and that is not limited to the necessary function of the operation of the construction machine performed by the first board;
a first controller of the first board configured to perform power monitoring of the first board and system monitoring of the first board in response to an activation of the construction machine, wherein the first controller further configured to perform activation processing of the first board in response to a signal that the power monitoring and the system monitoring of the first board are normal; and
a second controller of the second board configured to perform power monitoring of the second board and system monitoring of the second board in response to the activation processing of the first board, wherein the second controller further configured to perform activation processing of the second board in response to a signal that the power monitoring and the system monitoring of the second board are normal,
wherein the first board and the second board are housed inside a same housing,
each of the first board and the second board includes an internal power circuit converting source voltage supplied from a power source of the construction machine into a desired voltage,
construction machine information acquired from a state acquisition unit inside the construction machine is inputted to the first board, and
the first board includes a storage unit, temporarily stores the construction machine information acquired during the activation processing of the second board in the storage unit and transfers the construction machine information temporarily stored in the storage unit to the second board after the activation processing of the second board.

* * * * *